UNITED STATES PATENT OFFICE.

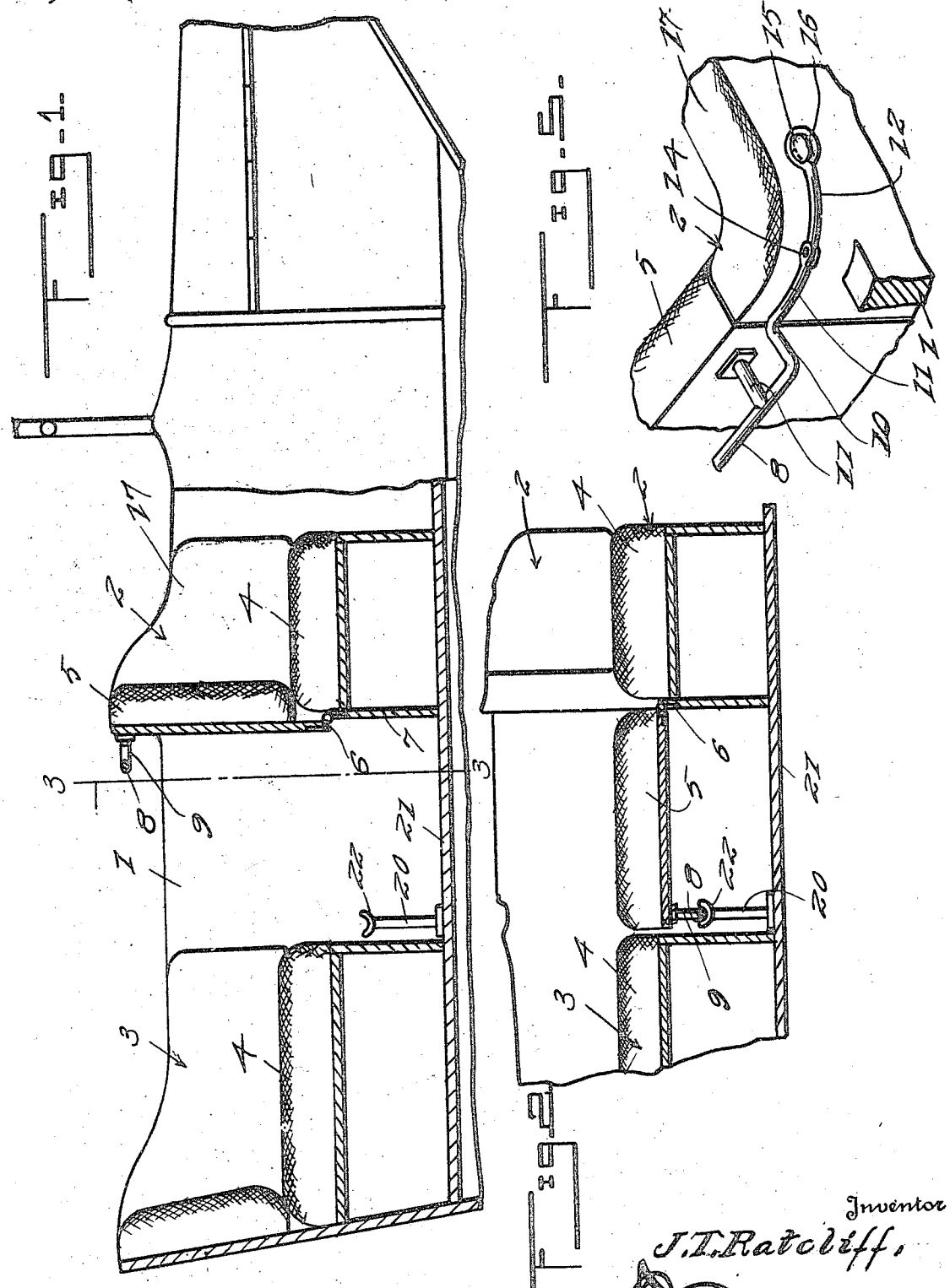

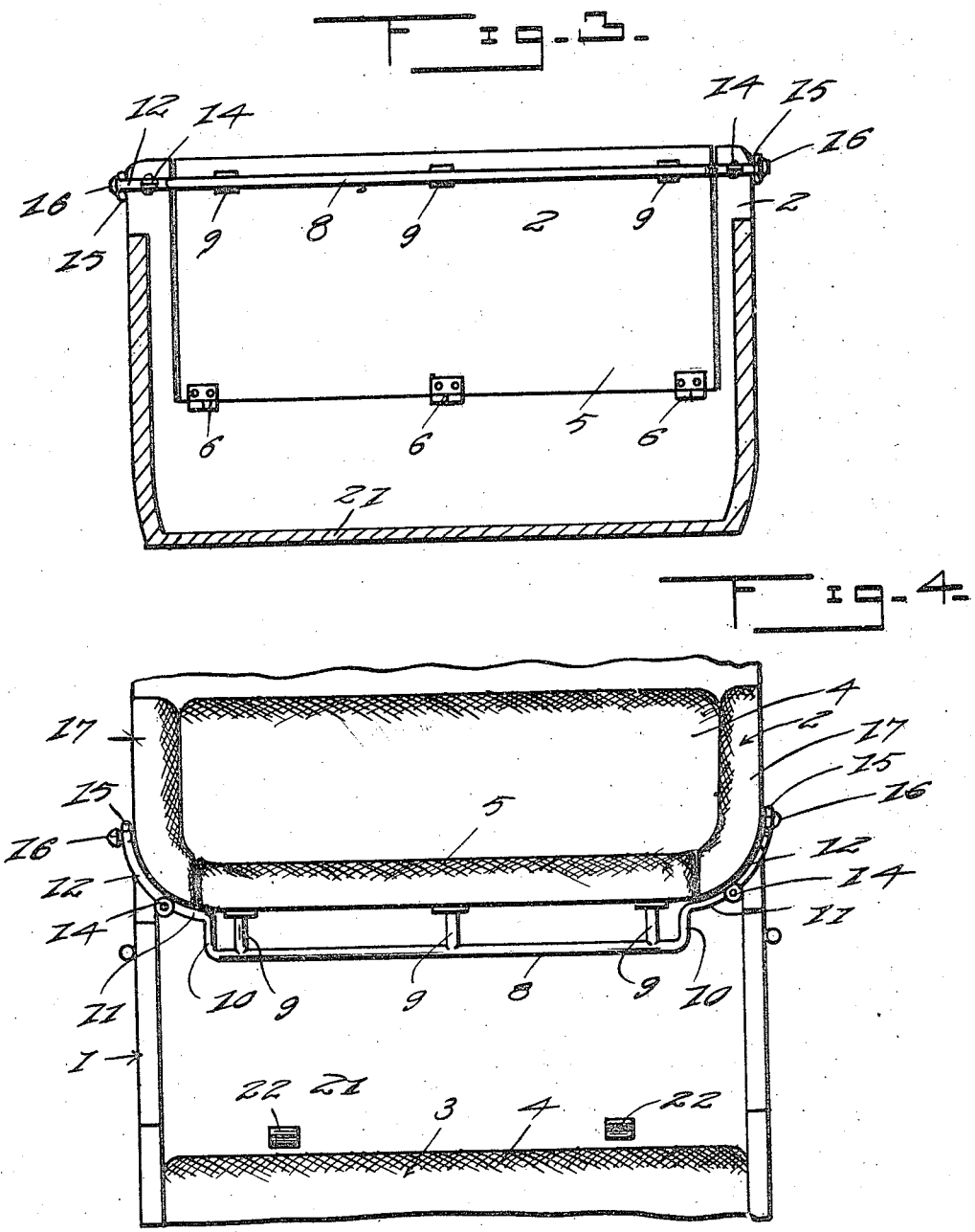

JOHN T. RATCLIFF, OF ELDORADO, OKLAHOMA.

RECLINING-SEAT FOR AUTOMOBILES.

1,288,676.

Specification of Letters Patent.     Patented Dec. 24, 1918.

Application filed March 17, 1917.   Serial No. 155,493.

*To all whom it may concern:*

Be it known that I, JOHN T. RATCLIFF, a citizen of the United States, residing at Eldorado, in the county of Jackson and State of Oklahoma, have invented certain new and useful Improvements in Reclining-Seats for Automobiles; and I do hereby declare the following to be a full, clear, and exact description of the invention, such as will enable others skilled in the art to which it appertains to make and use the same.

This invention relates to a seat construction for automobiles, and the primary object of the invention is to provide a front seat for automobiles the back of which may be lowered so that its upper surface will lie in the same plane with the top or upper surfaces of the bottoms of the front and rear seats of the automobile.

Another object of this invention is to provide means for holding the hinged section of the back of the front seat in a vertical position, which means includes a rod attached to and being spaced outwardly from the rear side of the back and the front seats, which rod has hinged sections connected to its ends adapted for mounting over pins or bolts carried by the sides of the seats for holding the back in a vertical position, which sections are moved out of engagement with the pins for allowing the back of the seat to be lowered.

With the foregoing and other objects in view, this invention consists in such novel features of construction, combination and arrangement of parts as will be hereinafter more fully described, illustrated in the accompanying drawings and claimed.

In describing the invention in detail, reference will be had to the accompanying drawings wherein like characters designate like and corresponding parts throughout the several views, and in which:—

Figure 1 is a fragmentary longitudinal section through an automobile body showing the improved seat construction applied thereto and showing the seat back in a vertical position;

Fig. 2 is a fragmentary view similar to Fig. 1, illustrating the back of the front seat in a lowered position;

Fig. 3 is a section on the line 3—3 of Fig. 1;

Fig. 4 is a fragmentary top plan of the front seat construction; and

Fig. 5 is a detail perspective view, illustrating the manner of holding the hinged back of the front seat in a vertical position.

Referring more particularly to the drawings, 1 designates the body of an ordinary automobile having a front seat structure 2 and a rear seat structure 3, each of which include the seat bottom 4.

The back 5 of the front seat 2 is cut free from the sides and bottom of the seat as clearly shown in Figs. 3 and 4 of the drawings, and it is hingedly connected by means of hinges as indicated at 6, to the lower supporting structure 7 of the front seat, so that it may be moved into a substantially horizontal position as indicated in Fig. 2 of the drawings. The back 5 of the front seat 2 has a robe rail 8 attached thereto by the usual type of bracket 9 which robe rail is bent inwardly toward the back of the seat as shown at 10 and outwardly, providing arcuate portions 11 which fit closely to the rear surface of the corners of the front seat. The arcuate portions 11 have sections 12 hingedly connected thereto, as shown at 14. The sections 12 of the rod structure have eyes 15 formed upon their outer ends which extend over bolts or pins 16. The pins 16 are carried by the outer surface of the ends or sides 17 of the front seat, so that when the eyes 15 are positioned over the bolts they will hold the back 5 of the front seat in a vertical position, and when it is desired to lower the hinged back 5, the hinged sections 12 are moved outwardly so that the eyes 15 will be out of engagement with the bolts or pins 16, which will allow the back 5 to be moved downwardly in the position illustrated in Fig. 2 of the drawings, so that the outer surface of the back will be positioned substantially in the same plane and in alinement with the top of the bottoms 4 of the front seats 2 and 3.

Standards 20 are attached to the floor 21 of the car and extend upwardly therefrom. The standards 20 have cup shaped members 22 formed upon their upper ends which receive the rod 8 as shown in Fig. 2 for supporting the back 5 in a horizontal position.

In reducing the invention to practice, certain minor features of construction, combination and arrangement of parts may necessitate alterations to which the patentee is entitled provided such alterations are comprehended within the scope of what is claimed.

What is claimed is:—

In an automobile construction, a seat including a bottom, sides and a back; hinges connecting the bottom and the back; a rail extending transversely of the back and a portion of the sides and having its ends bent to conform to the curvature of the sides; hinged end rails carried by the ends of the first named rail and having their outer ends apertured; bolts extending through said apertures and connected with the sides of the seat; and standards arranged rearwardly of the seat and having cup-shaped members at one end thereof to receive the transverse rail of said back.

In testimony whereof I affix my signature in presence of two witnesses.

JOHN T. RATCLIFF.

Witnesses:
B. HENDERSON,
R. L. BRADLEY.